United States Patent
Jolly et al.

(10) Patent No.: US 6,735,984 B1
(45) Date of Patent: May 18, 2004

(54) MAKING AN OPTICAL FIBER PREFORM INCLUDING REDUCING THE LENGTH OF A DEPOSITION LAYER

(75) Inventors: Jacques Jolly, Saint Ouen L'Aumone (FR); Rémi Fauche, Acheres (FR); Jean-Florent Campion, Conflans St Honorine (FR)

(73) Assignee: Alcatel, Paris (FR)

( * ) Notice: Subject to any disclaimer, the term of this patent is extended or adjusted under 35 U.S.C. 154(b) by 101 days.

(21) Appl. No.: 09/532,968

(22) Filed: Mar. 22, 2000

(30) Foreign Application Priority Data

Apr. 1, 1999 (FR) .............................. 99 04074

(51) Int. Cl.$^7$ ........................................ C03B 37/018
(52) U.S. Cl. ............................ 65/382; 65/421; 65/433
(58) Field of Search .......................... 65/421, 433, 382

(56) References Cited

U.S. PATENT DOCUMENTS

| | | | | |
|---|---|---|---|---|
| 5,211,732 A | * | 5/1993 | Abbott | 65/421 |
| 5,925,163 A | * | 7/1999 | Evans | 65/421 |
| 5,979,189 A | * | 11/1999 | Campion | 65/433 |

FOREIGN PATENT DOCUMENTS

| | | |
|---|---|---|
| EP | 0 727 392 A1 | 8/1996 |
| EP | 0 831 070 A1 | 3/1998 |

* cited by examiner

*Primary Examiner*—John Hoffmann
(74) *Attorney, Agent, or Firm*—Sughrue Mion, PLLC

(57) ABSTRACT

The method is designed to be implemented in an installation provided with means enabling a preform held between two points by supporting end-pieces to be rotated and to be moved in translation. Heater means for heating the preform by means of a plasma torch are associated with material supply means, so as to enable the preform to be manufactured in layers. Preform/torch relative displacements, with or without material being supplied, lead either to a new layer of material being deposited on the preform, or to the most recent layer deposited being glazed. Said method interposes a one-ended reduction in layer length, starting from one of the intermediate layers, while a succession of concentric layers are being deposited on the preform in a manner such that the lengths of the layers are progressively reduced so that the preform tapers towards it ends. The one-ended reduction leads to a limitation of the thickness of a determined segment at the level of the layer deposited immediately prior to the reduction.

8 Claims, 1 Drawing Sheet

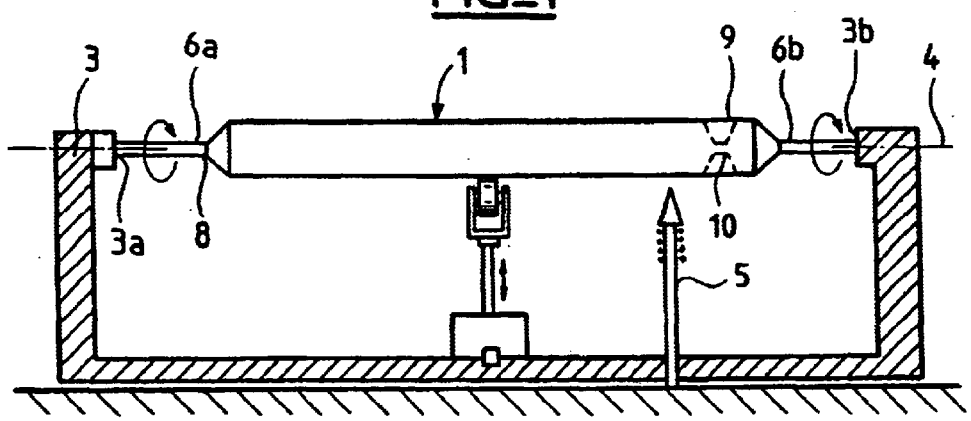
FIG_1 Prior Art
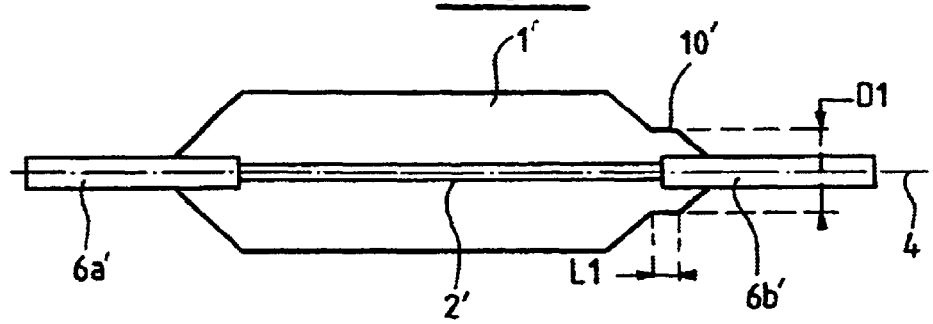
FIG_2
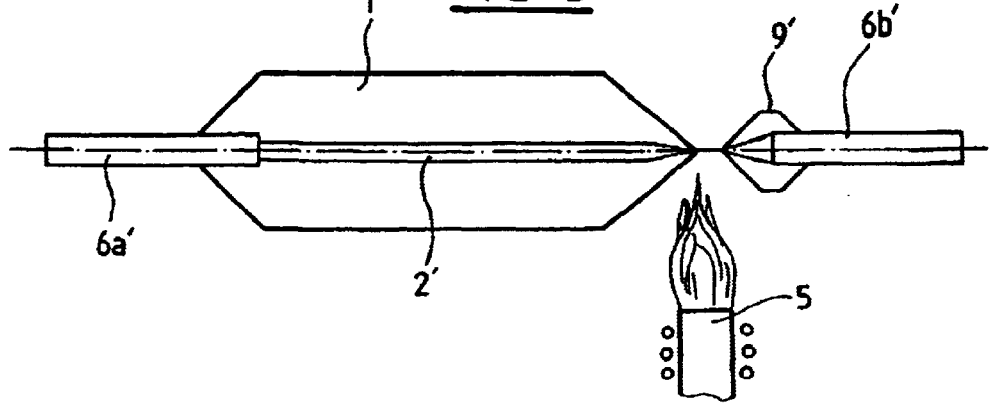
FIG_3

MAKING AN OPTICAL FIBER PREFORM INCLUDING REDUCING THE LENGTH OF A DEPOSITION LAYER The invention relates to a method of manufacturing optical fiber preforms, which method is more particularly intended for manufacturing preforms of large diameter.

BACKGROUND OF THE INVENTION

A known method of manufacturing or building up, i.e. "overcladding", preforms designed for the production of optical fibers makes provision to deposit silica on a primary preform which is equipped with supporting end-pieces at its ends, and which is carried by means enabling it to move along its axis and to rotate relative to a flame of an inductive plasma torch, into which silica grains are injected and in which they are melted. That method makes it possible to manufacture a preform of determined thickness, starting from a primary preform that is thinner, by superposing a succession of concentrically-deposited layers of silica. The respective lengths of the successive layers decrease so that the thickness of deposited silica that covers the preform and its end-pieces tapers uniformly towards the ends, from a central segment of determined length and diameter. A conical shape is imparted to one of the ends of each preform so as to facilitate the subsequent fiber-drawing operations starting from said end.

It is known that the desired conical shape at the fiber-drawing end of the preform can be obtained by drawing the-end-pieces of the preform as overclad with silica in opposite directions, after the preform has been locally melted by being heated to the core, in a zone of the central segment that is situated in the vicinity of the end to be made conical. Such drawing makes it possible to separate the preform from one of its two supporting end-pieces. The intense heating performed for drawing purposes suffers from the drawback of giving rise to high silica evaporation, the evaporated silica then cooling and forming soot which falls back in particular on the preform. Such soot affects the transparency of the preform and increases its roughness.

In order to remedy those drawbacks, the Applicant's Document EP-A-0 831 070 makes provision to perform the separation in two steps. A first drawing step causes the diameter of the preform in the zone that is heated for cleaving purposes to be reduced to a chosen diameter that is usually close to the diameter of a supporting end-piece. A glazing operation is provided for removing the unwanted deposit that has formed on the cold portions of the preform that have received soot during the heating performed for the first drawing step. The glazing is performed by passing the preform through the flame of the plasma torch without any material being supplied. A second drawing step terminates the separation in the smaller-diameter zone that is heated to the core for that purpose. The quantities of silica evaporated and re-deposited are small because of the small dimensions of the zone that is then heated.

That method including two separation steps is quite suitable when the preforms to be cleaved are of diameter that is not too large, e.g. of maximum diameter of about 80 mm.

However, it is not suitable when the preform diameter is such that heating to the core is lengthy and difficult to perform, thus making it difficult to obtain sufficient softening of the preform in the separation zone in which the drawing-apart is to be performed.

In addition, prolonged heating of a large-diameter preform gives rise to considerable silica evaporation from the heated zone, and causes a thick layer to be re-deposited on the cold portions of the preform and in particular on the portion close to the region that is to constitute the cone. That thick re-deposited layer does not necessarily vitrify properly during the intermediate glazing operation, and can give rise to a non-homogeneous zone that could disturb fiber drawing.

OBJECTS AND SUMMARY OF THE INVENTION

To remedy those drawbacks, the invention provides a method of manufacturing or building up, i.e. "overcladding", an optical fiber preform in an installation provided with means enabling a preform held horizontally at its ends between two mounting points by supporting end-pieces to be rotated axially and to be moved relatively in translation. Heater means for heating the preform by means of a plasma torch, which heater means are disposed radially relative to said. preform are associated with material supply means, so as to enable the preform to be manufactured in successive passes corresponding to the preform and the torch being displaced relative to each other, with or without material being supplied, these displacements therefore leading either to a new layer of material being deposited on the preform, or to the most recent layer deposited being glazed.

According to a characteristic of the invention, the method makes provision to interpose a one-ended reduction in the length of at least one layer, during a pass and starting from one of the intermediate layers, while a succession of concentric layers of material are being deposited on the preform in a manner such that the respective lengths of the layers, which lengths are determined by the preform/torch relative displacements, are progressively shortened as a result of a progressive reduction in the lengths of the displacements, so that the thickness of deposited material that covers the preform and a portion of each of the end-pieces decreases uniformly towards the ends, said one-ended reduction in layer length leading to a limitation of the thickness of material deposited on one of the end-pieces and on a limited-length preform zone that is longitudinally adjacent to said end-piece, at the level set by the layer deposited immediately prior to said one-ended reduction.

According to a characteristic of the invention, the method includes at least one hot drawing operation performed to separate a preform from one of the end-pieces in said limited-length preform zone which is adjacent to said end-piece, after said succession of layers required for forming the preform has been deposited.

According to a characteristic of a variant of the invention, the method includes a hot-drawing operation performed in two steps, separated by a preform glazing operation, in said limited-length preform zone which is adjacent to an end-piece so as to separate the preform and said end-piece, the first drawing step being associated with heating to the core causing softening by melting in said limited-length preform zone, and producing a reduction in diameter, the second step also being associated with heating to the core causing softening by melting and achieving full separation.

BRIEF DESCRIPTION OF THE DRAWING

The invention, its characteristics and its advantages appear more clearly in the following description given with reference to the below-listed figures, in which:

FIG. 1 is a diagrammatic view of a known installation making it possible to implement the method of the invention for producing a preform;

FIG. 2 is a diagrammatic view of a preform made using the method of the invention; and FIG. 3 is a diagrammatic view of a preform of the invention as obtained after separation.

MORE DETAILED DESCRIPTION

The installation shown diagrammatically in FIG. 1 is assumed to make it possible to manufacture or to build up or "overclad" optical fiber preforms. The installation makes it possible to obtain an overclad preform 1 starting from a primary preform 2, of axis 4, such an overclad preform being known from the prior art and shown diagrammatically in FIG. 2.

The installation includes means 3 of the lathe type making it possible to rotate the preform axially as it is held horizontally at its ends via end-pieces 6a, 6b between two mounting points 3a, 3b. As is known, the end-pieces are previously fixed to the ends of the primary preform. One of them, referenced 6a in this example, remains secured to the finally-obtained preform, while the other, referenced 6b in this example, is separated from the final preform so that an optical fiber can be obtained by performing a fiber-drawing operation known to the person skilled in the art.

The installation also includes plasma torch heater means 5 which are more generally positioned radially relative to the preform when said preform is held horizontally between the mounting points 3a, 3b. Material supply means (not shown) are associated with the plasma torch. They are conventionally used to inject grains of silica into the flame of the torch which melts said grains. The torch is positioned in known manner such that silica is deposited in localized manner on the preform. By moving the preform and the torch relative to each other, it is possible to deposit silica on a zone of limited width over the length of the preform, and by rotating the preform, it is possible to cover the entire preform with a deposit. It is possible for the torch to be displaced in translation relative to the preform, but the torch is more conventionally mounted on a lathe, and said lathe causes the preform as held by its ends to move in translation relative to the torch which is then fixed.

Overcladding a primary preform, such as 2' in FIG. 2, so as to obtain a preform 1 or 1' that can be used to produce a fiber, is performed by implementing successive passes to deposit a succession of superposed concentric layers. It is known that the lengths of the successive layers can be reduced progressively by progressively reducing the lengths of the preform/torch relative displacements parallel to the axis 4 of the preform. It is thus possible to make the thickness of deposited material that covers the primary preform and a portion of each of its end-pieces decrease progressively at the two ends and on either side of a central segment of uniform diameter, as shown in FIG. 1.

It is necessary to separate one of the end-pieces from the finally-obtained preform in order to obtain an end from which a fiber can be produced. That operation is performed by drawing after intensive heating in a limited zone of the preform where the glass is softened by melting so as to facilitate separation. High silica evaporation is produced during that operation and the evaporated silica falls back down in the form of soot that solidifies on the coldest portions of the preform on which it is deposited.

To remedy that drawback, Document EP-A-0 831 070 makes provision to perform the separation in two steps, between which a glazing stage is interposed. The glazing stage aims to remove the silica that has been re-deposited during the first of the separation steps. During the first step, the diameter of the preform 1, as fully overclad, is annularly reduced to a value which corresponds, for example, to the diameter of an end-piece, in a determined zone 10 in which the separation is to take place. As shown in FIG. 1, this zone 10 is chosen to be in the vicinity of the end-piece 6b to be removed, and following on from the portion 9 of the preform that is constituted by the successive deposition of layers of silica on the primary preform and on the end-piece 6b, where they are joined together prior to separation.

The intensive heating that is performed by means of the plasma torch 5 during the second step and that accompanies the separation performed by drawing the preform 1 and the end-piece 6b apart, gives rise to only a limited evaporation of silica. The evaporation and the corresponding re-deposition are thus significantly smaller than those produced during the preceding step, insofar as the softening to be performed affects only the zone 10 and therefore concerns only a relatively small quantity of silica.

However, as indicated, that solution is not always fully satisfactory in particular when cleaving is to be performed on a preform of large diameter.

In the invention, efforts are thus made to limit the quantity of silica to be melted to the core to as small as possible, and provision is thus made to avoid as much as possible depositing concentric layers of silica on the preform 1 in the zones to be removed which correspond to is the zones 9 and 10 shown in FIG. 1.

To this end, in the invention, during the deposition of the succession of layers and starting from one of the intermediate layers, provision is made to interpose, during at least one pass, a one-ended reduction in the length of the layer of material deposited in said pass. The length of each concentric layer is a function of the length of relative displacement provided between the preform and the torch 5 in operation along the longitudinal axis 4 of said preform, for the purpose of depositing said layer.

A preform 1' obtained by implementing the method of the invention is made from a commonly-used primary preform 2', of circularly cylindrical appearance, carried at its ends by end-pieces 6a' and 6b', as shown in FIG. 2. During a first portion of the succession of material-depositing operations, the concentric layers are progressively shortened at either end of a central segment, as defined by a variation relationship that is, for example, linear and that is imposed by the preform/torch relative displacements. As a result of this shortening, the ends of the preform being overclad tend to constitute points, with each end, taking up an approximately conical appearance.

A one-ended reduction in layer length is imposed by a corresponding reduction in the relative displacement between the torch and the preform. This one-ended reduction is performed during an overcladding pass during which the preform 1' being overclad is overclad with a layer of material. The reduction is, for example, set to a value L1 lying in the range 10 millimeters to 200 millimeters. For example, it may be triggered when a determined diameter value D1 is reached for the preform being overclad, as a result of the successive depositions of material during the passes, which passes have led to a predetermined number of layers being formed. The diameter value D1 is chosen to be greater than the diameter of the end-piece 6b', and preferably less than 70 millimeters.

The deposition of the concentric layers is then continued on the preform 1a starting from the layer whose length has been reduced at one end, the deposition being continued with a relationship of decreasing variation in length which is optionally the same decreasing relationship as used previously for the layers which, by being superposed, made it possible to reach the thickness of material corresponding to the diameter D1. This decreasing relationship is, for example, a linear relationship leading to a circularly-symmetrical intermediate segment being obtained between the cylindrical central portion of the overclad preform 1' and the cylindrical segment 10' of diameter D1 which results from the one-ended reduction in length performed at the end at which the end-piece 6b' is situated. In practice, said decreasing relationship results in a series of setpoints whose characteristics are supplied to a programmable logic controller (not shown) which is assigned to controlling the preform/torch displacements. The decreasing relationship is assumed to be the same for both ends of the preform in the example shown in FIG. 2.

A different decreasing relationship may also be considered, firstly for each preform end, and secondly for the intermediate portion connecting the cylindrical central segment of the preform to the cylindrical segment 10'. The purpose of this is to obtain one preform end whose shape, after removal of the end-piece 6b', differs from that of a cone, e.g. by being substantially bulb-shaped. Preferably the variation relationship is chosen to obtain an unbroken curved connection between a circularly-symmetrical intermediate segment and the cylindrical central segment of the preform.

A non-linear decrease makes it possible, for example, to obtain a pointed end, united with the central segment by a curved junction whose appearance is that of a paraboloid of revolution which curves without any discontinuity in the zone where it joins the central segment.

It is also possible to make a cylindrical segment 10' which does not correspond to an exact circular cylinder insofar as, for example, it is slightly frustoconical.

In any event, it is necessary to separate the end piece 6b' from the resulting preform 1' in order to enable fiber-drawing to be performed. The separation is effected in that limited-length zone of the preform which is adjacent to the end-piece and which makes up the cylindrical segment 10' with it. As is known, the interface zone, where an end-piece is united with a preform, is not used for fiber-drawing because it is not sufficiently homogeneous as a result of the glass-glass weld by means of which the end-piece and the preform are secured together.

The separation is effected by drawing the glass constituting the segment 10' which is made locally soft by being heated to the core by means of the plasma torch 5, in the zone of the preform that includes the segment 10' and that is adjacent to the end-piece. This drawing is performed by exerting axial traction in opposite directions via the end-pieces 6a' and 6b'. It results in the link that existed between the preform 1' and its end-piece 6b' being cleaved, as shown diagrammatically in FIG. 3. This cleaving is facilitated by the intensive heating being localized, as created by the heating to the core for the purpose of softening the glass by melting it, in a portion of the segment 10' and by the fact that the segment is of small diameter relative to the central segment of the preform 1'.

A substantially conical shape is obtained at that end of the preform which has been broken away from the end-piece 6b' and from the residual portion of preform 9' that the end-piece continues to support after separation.

As indicated, the choice of the shape of the end of the preform that is best suited to fiber-drawing is obtained by acting on the factors involved in the separation stage performed by drawing, and in particular on the length variation relationship chosen for the superposed concentric layers of the junction between the central cylindrical segment of the overclad preform 1' and the segment 10'.

This makes it possible to avoid having to perform the separation on a preform end that has a diameter corresponding to the diameter of the central segment of the preform, when said diameter reaches the above-mentioned value limit above which the operations performed by means of a plasma torch become lengthy and difficult to perform. This limitation in diameter offers the advantage of involving only limited traction forces for performing the drawing operation.

In addition, the duration of the separation operation is reduced because the diameter of the segment 10' is itself limited compared with the overall outside diameter of the preform. This also limits the unwanted quantity of silica re-deposited during the heating to the core.

What is claimed is:

1. A method of building up an optical fiber preform in an installation provided with means enabling a preform held horizontally at ends of the preform between two mounting points by supporting the ends of the preform with end pieces for rotation about an axis of the preform and for relative movement in a direction parallel to the axis of the preform said installation also being provided with heater means for heating the preform by means of a plasma torch, which heater means is disposed radially relative to said preform and is associated with material supply means, so as to enable the preform to be manufactured in successive passes corresponding to the preform and the torch being displaced relative to each other, certain ones of the passes carried out with material being supplied and certain other ones of the passes being carried out without material being supplied, so that each successive pass leads to a new layer of material being deposited on the preform when material is supplied and to the most recent layer deposited being glazed when material is not supplied, said method interposing a one-ended reduction in the length of at least one layer, during a pass and starting from one new layer that is an intermediate layer, while a succession of concentric layers of material are being deposited on the preform in a manner such that the respective lengths of the layers, which lengths are determined by the relative displacements between the torch and the preform, are progressively shortened as a result of a progressive reduction in the lengths of the displacements, so that the thickness of deposited material that covers the preform and a portion of each of the end-pieces decreases uniformly towards the ends, said one-ended reduction in layer length leading to a limitation of the thickness of material deposited on one of the end-pieces and on a limited-length preform zone that is longitudinally adjacent to said end-piece, at the level set by the layer deposited immediately prior to said one-ended reduction, and wherein the one ended reduction in the length is greater than a reduction in length of an immediate prior layer from a second to the immediate prior layer.

2. A method according to claim 1, wherein the one-ended reduction is performed after depositing a determined number of concentric layers leading to a given preform diameter.

3. A method according to claim 2, wherein the given preform diameter, above which a one-ended reduction in layer length is performed is greater than the diameter of the end-piece in question, and less than 70 millimeters.

4. A method according to claim 1, wherein provision is made for the one-ended reduction in layer length to lie in the range 10 millimeters to 200 millimeters.

5. A method according to claim 1, providing a reduction in layer length that satisfies a linear relationship, at least beyond the layer whose length is reduced at one end and that is deposited first, and at that end of the preform at which said reduction is provided.

6. A method according to claim 1, providing a reduction in layer length that satisfies a non-linear decreasing relationship, at least beyond the layer whose length is reduced at one end and that is deposited first, and at that end of the preform at which said reduction is provided, and wherein the non-linear decreasing relationship is satisfied prior to a first drawing of the preform for separation from one of the end-pieces.

7. A method according to claim 1, including at least one hot drawing operation performed to separate a preform from one of the end-pieces in said limited-length preform zone which is adjacent to said end-piece, after said succession of layers required for forming the preform has been deposited.

8. A method according to claim 1, including a hot-drawing operation performed in two steps, separated by a preform glazing operation, in said limited-length preform zone which is adjacent to an end-piece so as to separate the preform and said end-piece, the first drawing step being associated with heating to the core causing softening by melting in said limited-length preform zone, and producing a reduction in diameter, the second step also being associated with heating to the core causing softening by melting and achieving fill separation.

* * * * *